(12) United States Patent
Border et al.

(10) Patent No.: US 7,602,418 B2
(45) Date of Patent: Oct. 13, 2009

(54) DIGITAL IMAGE WITH REDUCED OBJECT MOTION BLUR

(75) Inventors: John N. Border, Walworth, NY (US); Efrain O. Morales, Rochester, NY (US); Aaron T. Deever, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 553 days.

(21) Appl. No.: 11/548,309

(22) Filed: Oct. 11, 2006

(65) Prior Publication Data

US 2008/0088711 A1 Apr. 17, 2008

(51) Int. Cl.
*H04N 5/228* (2006.01)
(52) U.S. Cl. .................................. 348/208.6
(58) Field of Classification Search ........................ None
See application file for complete search history.

(56) References Cited

U.S. PATENT DOCUMENTS

| | | | |
|---|---|---|---|
| 3,971,065 A | 7/1976 | Bayer | |
| 5,335,041 A | 8/1994 | Fox | |
| 5,652,621 A | 7/1997 | Adams, Jr. et al. | |
| 5,774,183 A | 6/1998 | Riek et al. | |
| 6,441,848 B1 | 8/2002 | Tull | |
| 7,295,344 B2 * | 11/2007 | Adachi | 358/1.9 |
| 2003/0011717 A1 * | 1/2003 | McConica | 348/699 |
| 2004/0013319 A1 * | 1/2004 | Wenstrand et al. | 382/299 |
| 2004/0061795 A1 | 4/2004 | Kondo et al. | |
| 2006/0115297 A1 | 6/2006 | Nakamaru | |
| 2006/0187324 A1 * | 8/2006 | Lin | 348/241 |
| 2006/0274156 A1 * | 12/2006 | Rabbani et al. | 348/208.99 |
| 2008/0226149 A1 * | 9/2008 | Wischmann et al. | 382/131 |

\* cited by examiner

*Primary Examiner*—Justin P Misleh
(74) *Attorney, Agent, or Firm*—Raymond L. Owens

(57) ABSTRACT

A method of producing a digital image with reduced object motion blur, includes capturing at least a first and second digital image of a scene using an exposure time that reduces image blur; combining pixels of the first digital image to produce a third digital image which is brighter than the first and second digital images and has a lower resolution than either the first or second digital images; identifying static and moving regions between the first and second digital images; operating on the first and second digital images to produce a fourth digital image which is brighter than the first and second digital images and has object motion blur; and replacing the moving regions in the fourth digital image with corresponding regions from the third digital image to thereby provide a fifth digital image with reduced object motion blur and increased brightness.

8 Claims, 4 Drawing Sheets

DIGITAL IMAGE WITH REDUCED OBJECT MOTION BLUR

FIELD OF THE INVENTION

This invention relates to producing a digital image with reduced object motion blur.

BACKGROUND OF THE INVENTION

An electronic imaging system depends on a lens system to form an image on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). A sensor consists of a two-dimensional array of individual picture element sensors, or pixels. Each pixel is typically provided with either a red, green, or blue filter, as described by Bayer in commonly assigned U.S. Pat. No. 3,971,065 issued Jul. 20, 1976, so that a full color image can be produced. Regardless of electronic technology employed, e.g., CCD or CMOS, the pixel acts as a bucket in which photoelectrons are accumulated in direct proportion to amount of light that strikes the pixel during the capture of an image by the electronic imaging system.

Not all of the light that enters the front optical element of an electronic imaging system strikes a pixel. Much of the light is lost when passing through the optical path of the electronic imaging system. Typically, about 5% of the light is lost due to lens reflections and haze and about 60% is lost because of the color filter array. Moreover, some of the light strikes areas of the pixel that are not light sensitive. To gather the amount of light that is necessary to make a correct exposure, the electronic imaging sensor must gather light for an interval of time called the exposure time. Based on brightness measurements of the scene to be imaged, the electronic imaging system, typically an automatic exposure control, is employed to determine a suitable exposure time that will yield an image with effective brightness. The dimmer the scene, the larger the amount of time the electronic imaging system must gather light to make a correct exposure. If objects in the scene are moving during capture, a longer exposure time may result in an image with object motion blur. Object motion blur is different from image capture device-induced blur which is produced when the image capture device is moving relative to the scene during capture and is present in an entire image. Methods to reduce image capture device-induced blur are well known to those in the field. One method is to use a gyroscopic device to measure image capture device motion and then use a special lens with a lens element that can be moved laterally to cause the image on the electronic image sensor in the image capture device to move in a direction that compensates for the camera motion. A second method is described in U.S. patent application Ser. No. 11/130,690 by Deever et al, this method is based on a digital shifting of images in a video capture to compensate for movement of the digital camera and reduce image capture device-induced blur and to stabilize the images in the video.

One method to reduce object motion blur is to shorten the exposure time. This method under-exposes the electronic image sensor during image capture so dark images are generated. An analog or digital gain can be applied to the image signal to brighten the dark images, but those skilled in the art will recognize that this will result in noisy images.

Another method to reduce object motion blur is to shorten the exposure time and preserve more of the light that passes through the optical path and direct it to the pixels of the electronic image sensor. This method can produce images with reduced object motion blur and acceptable noise levels. However, the current industry trend in electronic imaging systems is to make imaging systems smaller and less expensive. High-grade optical elements with large apertures, which can gather more light and preserve more light passing through them, are therefore not practicable.

Another method to reduce object motion blur is to shorten the exposure time and supplement the available light with a photographic flash. A photographic flash produces a strong light flux that is sustained for a fraction of a second and the exposure time is set to encompass the flash time. The exposure time can be set to a significantly shorter interval than without a flash since the photographic flash is strong. Therefore, the blur caused by object motion during the exposure is reduced. However, objects in bright daylight can still have motion blur and flash photography is useful if the distance between the flash and the object is small.

U.S. Pat. No. 6,441,848 issued Aug. 27, 2002 to Tull describes a digital camera with an electronic image sensor that removes object motion blur by monitoring the rate at which electrons are collected by each pixel. If the rate at which light strikes a pixel varies, then the brightness of the image that the pixel is viewing must be changing. When a circuit built into the sensor array detects that the image brightness is changing, the amount of charge collected is preserved and the time at which brightness change was detected is recorded. Each pixel value where exposure was stopped is adjusted to the proper value by linearly extrapolating the pixel value so that the pixel value corresponds to the dynamic range of the entire image. A disadvantage of this approach is that the extrapolated pixel values, of an object that is already in motion when the exposure begins, are highly uncertain. The image brightness, as seen by the sensor, never has a constant value and, therefore, the uncertainty in the extrapolated pixel values results in an image with motion artifacts. Another disadvantage is that it uses specialized hardware so it cannot be used with the conventional electronic image sensors that are used in current commercial cameras.

Thus, there exists a need for producing images with reduced object motion blur, by using conventional electronic image sensors, without the use of a photographic flash, and without increasing image noise.

SUMMARY OF THE INVENTION

It is an object of the present invention to produce a digital image with reduced motion object blur that overcomes one or more of the problems set forth above. Briefly summarized, according to one aspect of the present invention, the invention provides a method of producing a digital image with reduced object motion blur, comprising:

a. capturing at least a first and second digital image of a scene using an exposure time that reduces image blur;

b. combining pixels of the first digital image to produce a third digital image which is brighter than the first and second digital images and has a lower resolution than either the first or second digital images;

c. identifying static and moving regions between the first and second digital images;

d. operating on the first and second digital images to produce a fourth digital image which is brighter than the first and second digital images and has object motion blur; and e. replacing the moving regions in the fourth digital image with corresponding regions from the third digital image to thereby provide a fifth digital image with reduced object motion blur and increased brightness.

An advantage of the present invention is that images with reduced object motion blur can be produced with basic changes to the image processing software without having to use a photographic flash or long exposure times to properly expose a single image.

A further advantage of the present invention is that images with reduced image capture device-induced blur can be produced in still images without the need for costly special lenses with laterally moveable lens elements.

This and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

A digital image includes one or more digital image channels. Each digital image channel includes a two-dimensional array of pixels. Each pixel value relates to the amount of light received by an electronic image sensor corresponding to the geometrical domain of the pixel. For color imaging applications, a digital image will typically consist of red, green, and blue digital image channels. Other configurations, such as using cyan, magenta, and yellow image channels, are also practiced. For monochrome applications, the digital image consists of one digital image channel. Those skilled in the art will recognize that the present invention can be applied to, but is not limited to, a digital image for any of the above-mentioned applications.

Although the present invention describes a digital image channel as a two-dimensional array of pixel values arranged by rows and columns, those skilled in the art will recognize that the present invention can be applied to mosaic (non-rectilinear) arrays with equal effect. Those skilled in the art will also recognize that, although the present invention describes replacing an original pixel value with processed pixel values to form a new digital image with the processed pixel values, retaining the original pixel values is also contemplated.

Imaging devices employing electronic image sensors are well known in the art. Therefore, the present description will be directed, in particular, to elements forming part of, or cooperating more directly with, a method in accordance with the present invention. Elements not specifically shown or described herein are selected from those known in the art. Note that as used herein, the term image is a two-dimensional array of pixel values. An image can be a two-dimensional subset of another image. Given the invention as described in the following materials, software not specifically shown, described, or suggested herein, that is useful for implementation of the invention, is conventional and within the ordinary skill in such arts.

Figure 1:
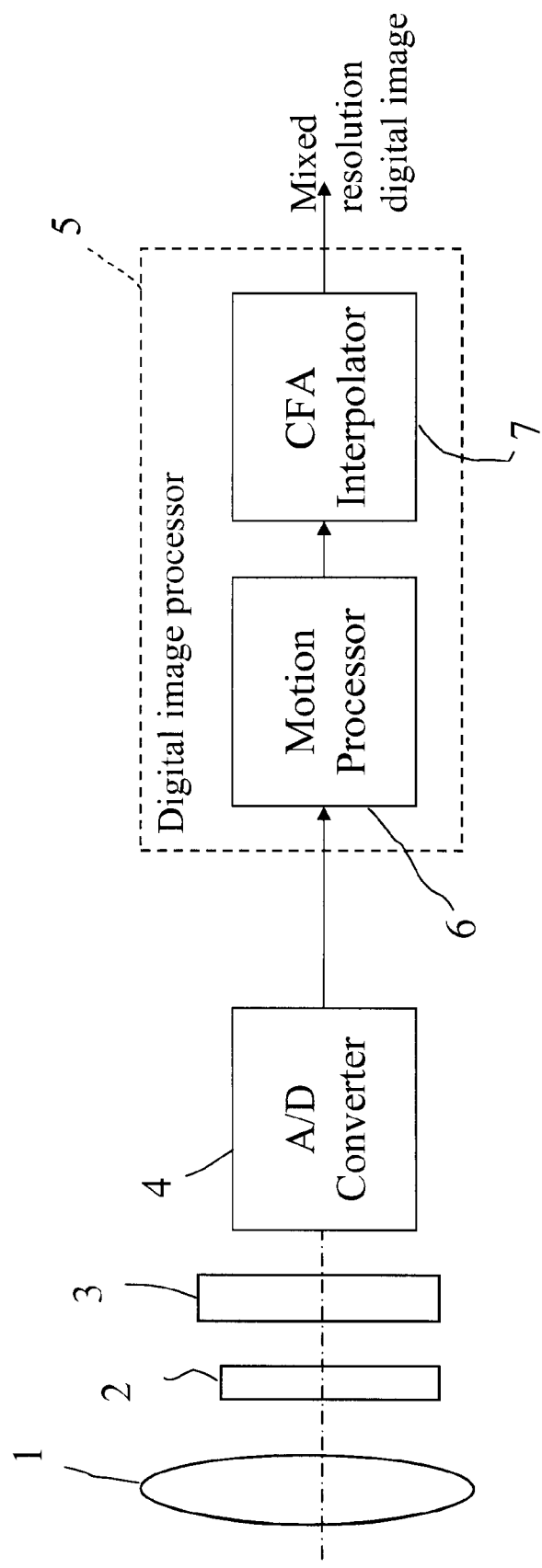
FIG. 1 is a block diagram of a digital still camera system that employs a conventional sensor and uses the processing methods of the present invention.
Figure 3:
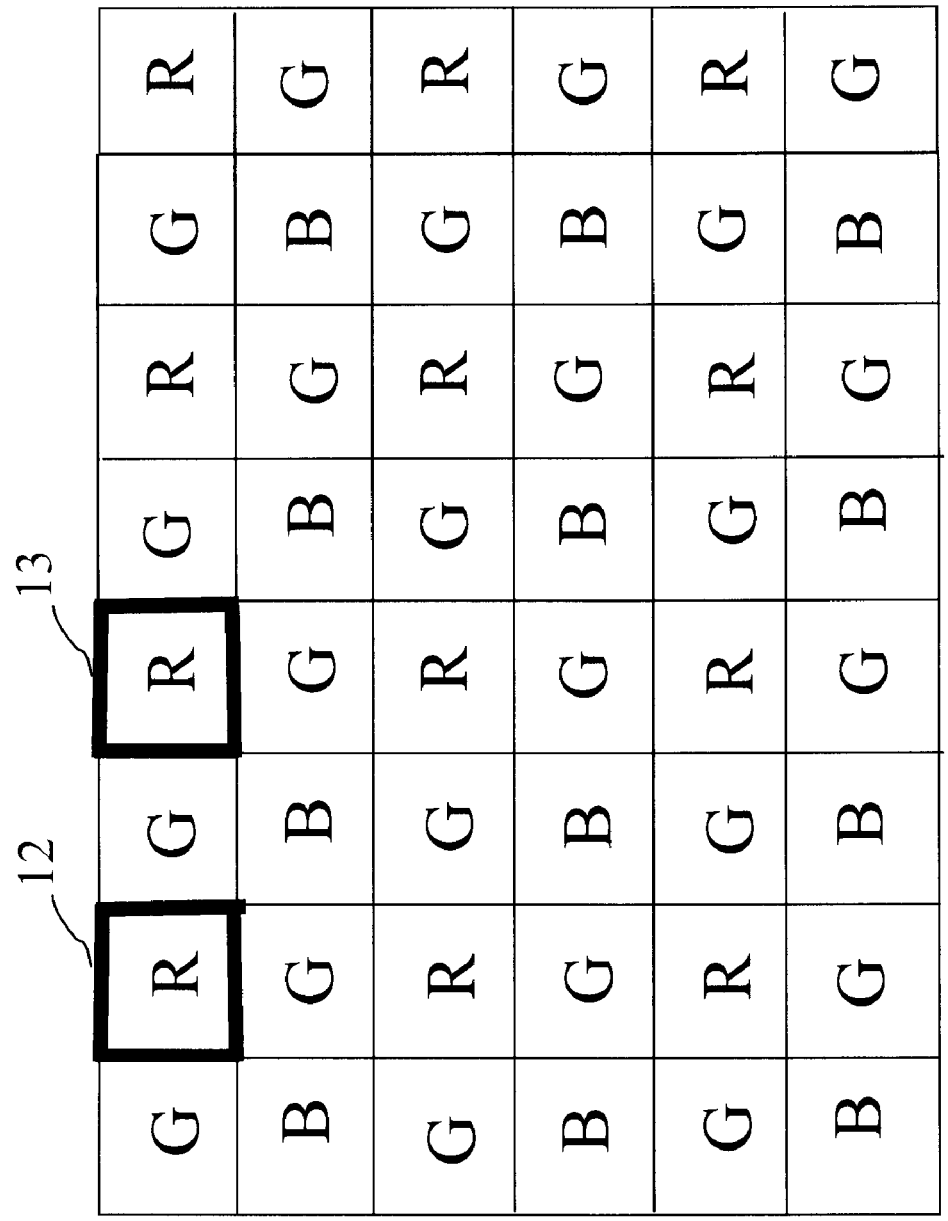
FIG. 3 is a diagram of a Bayer color filter array.

The essential elements employed in the practice of the present invention are shown as a functional block diagram in FIG. 1. Light from an object or scene is incident upon a lens 1 forming a photographic image on an electronic image sensor 3 such as a charged-coupled device (CCD) with a color filter array (CFA). Note that other devices, such as complimentary metal oxide semiconductor (CMOS) devices, can be used as the electronic image sensor 3. An optical low pass filter 2, placed between the lens 1 and the electronic image sensor 3, performs a slight blurring of the imaged light in order to reduce the occurrence of aliasing. Each photosite of the electronic image sensor 3 is typically provided with either a red, green, or blue filter, as described by Bayer in commonly assigned U.S. Pat. No. 3,971,065 issued Jul. 20, 1976. The Bayer array is a color filter array in which green filters are located in a checkerboard pattern over the photosites with red and blue filters alternating line by line to fill the interstices of the checkerboard pattern. The array has twice as many green filter sites as either red or blue filter sites. See FIG. 3. The method described herein can be easily extended to color filter arrays with different arrangements of the color filters, a different number of color filters, or a different set of color filters.

The amount of time that the light is gathered by the electronic image sensor 3 is typically predetermined by an automatic exposure control. The automatic exposure control can be selected from those known in the art, an example of which is disclosed in U.S. Pat. No. 5,335,041 issued Aug. 2, 1994. Based on brightness measurements of a scene to be imaged, the electronic imaging system typically employs automatic exposure control processing to determine an effective exposure time, $t_e$, that will yield an image with effective brightness. In the present invention, the exposure time, determined by the automatic exposure control $t_e$, is modified by dividing it by some integer number n. The reduced exposure time can be $t'=t_e/n$, where n is a positive integer greater than one. One skilled in the art will recognize that the greater the number n, the more object motion blur is reduced in each of the n images. At least first $i_1(x,y)$ and second $i_2(x,y)$ digital images, where (x,y) specifies the indices of the pixel location with reference to the electronic image sensor, can be captured, each with reduced exposure time t' instead of a single image capture with exposure time $t_e$, forming a sequence of n images wherein t' is less than $t_e$. Therefore, the cumulative exposure time for the sequence of n images is equal to $t_e$ or greater. Those skilled in the art will recognize that it is not necessary to employ the same modified exposure time t' in capturing each image in the sequence and that the sequence can contain less than n images at the expense of increased image noise. For example, the modified exposure time t' that is employed can be half of $t_e$ and the captured sequence can contain two images.

An A/D converter 4 receives, in series for each captured image in the sequence, the voltage signal corresponding to the imaged light from the photosites on the electronic imager sensor 3 and produces an image signal corresponding to the voltage signal that is a sparsely sampled high resolution digital image. Since the electronic image sensor 3 has multiple types of photosites (e.g. red, green, or blue) but produces only a single value at each pixel location, a digital image, as captured, is a sparsely sampled digital image with respect to color. The pixel values of the digital image output from the A/D converter 4 constitute a sparsely sampled digital image having red, green, and blue pixel values at neighboring pixel locations. It is desirable to produce a pixel value corresponding to an exposure for each of the red, green, and blue exposures at each photosite location. The digital image processor 5 receives, in series for each captured image in the sequence, the sparsely sampled high resolution digital images from the A/D converter 4, modifies the image signals and produces a full resolution digital image with red, green, and blue values for all pixel locations. The digital image processor 5 can be a programmed personal computer, a microprocessor or a digital image processor. The present invention can be practiced with any image capture device such as a digital camera, a mobile phone, a film or reflection scanner, or any other device that produces a digital image.

In a first embodiment of the invention, we will assume that the image capture device does not move between the n captures in the sequence. The digital image processor 5 shown in FIG. 1 contains two sub-components: the motion processor 6 and the CFA interpolator 7. The image signals of the captured sequence are received from the A/D converter 4 by the motion processor 6. The motion processor 6 processes the sparsely sampled high resolution digital image outputs from the A/D converter 4 to create a new digital image with reduced object motion blur. For an example, in which a first digital image $i_1(x,y)$ and a second digital image $i_2(x,y)$ are captured. Digital image processor 5 combines pixels of the first digital image $i_1(x,y)$ to produce a third digital image $c(x,y)$ which is brighter than the first $i_1(x,y)$ and second $i_2(x,y)$ digital images and has a lower resolution than either the first $i_1(x,y)$ or second $i_2(x,y)$ digital images.

An object motion detector 10 (see FIG. 2) identifies static and moving regions between the first and second digital images to produce a motion map $p(x,y)$.

A fourth digital image $m(x,y)$ with object motion blur is produced by the digital image processor 5. The digital image processor 5 sums the first $i_1(x,y)$ and second $i_2(x,y)$ digital images from the captured sequence to produce the fourth digital image $m(x,y)$ that is brighter than either the first or second digital image but object motion blur is present in the moving regions.

Next, the motion map $p(x,y)$ as produced by the object motion detector 10 is used to identify the regions in the fourth digital image $m(x,y)$ that are replaced with corresponding regions from the third digital image $c(x,y)$ to thereby produce a fifth digital image $d(x,y)$. Since the moving regions are replaced by corresponding regions from the third image which is based on only one captured image, the effects of object motion between multiple image captures in the n images is eliminated. As a result, the fifth digital image $d(x,y)$ has reduced object motion blur and increased brightness.

Figure 2:
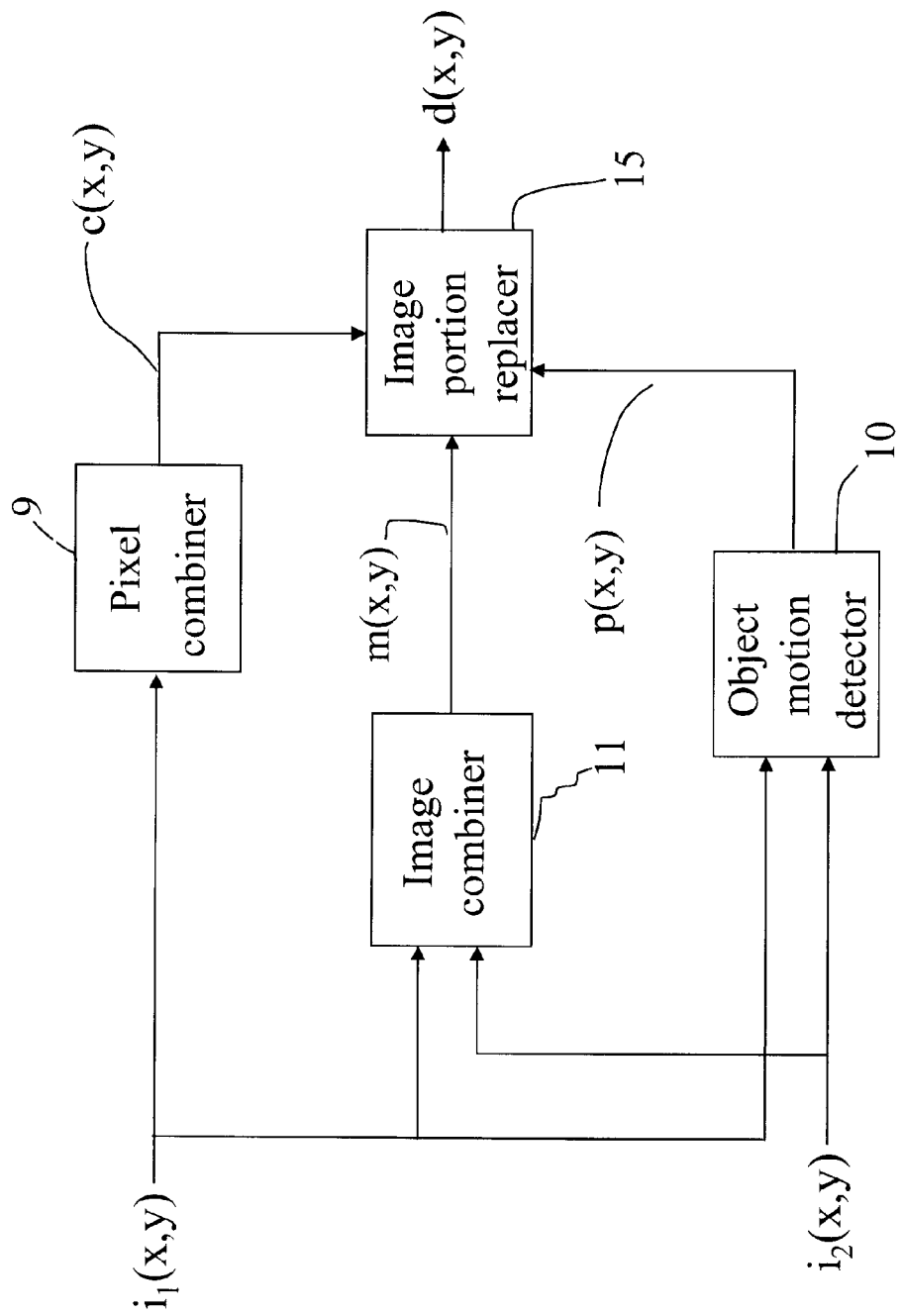
FIG. 2 is a flow diagram which illustrates the present invention when only objects are moving in the scene.

More specifically, the fifth digital image $d(x,y)$ as output from the motion processor 6 is a digital image that is a sparsely sampled digital image with reduced object motion blur and areas of both full resolution and lower resolution. The motion processor 6 then transmits the fifth digital image $d(x,y)$ to the CFA interpolator 7 where the color values are interpolated to provide red, green and blue color values at each pixel. The purpose of the CFA interpolator 7 is to generate a full description of the color for each pixel location of the sensed photographic image. Any commonly known CFA interpolator can be used, and a description of one CFA interpolator is disclosed in U.S. Pat. No. 5,652,621 issued Jul. 29, 1997 to Adams et al. The operation of the motion processor 6 is more fully explained with reference to FIG. 2. The sparsely sampled high resolution digital image outputs from the A/D converter 4 are received by the motion processor 6 which produces the afore mentioned fifth digital image $d(x,y)$ with reduced object motion blur. FIG. 2 represents the motion processor in the first preferred embodiment of the present invention in which for example, two sparsely sampled digital images $i_1(x,y)$ and $i_2(x,y)$ are captured in sequence by the electronic image sensor 3. The two sparsely sampled digital images $i_1(x,y)$ and $i_2(x,y)$ are transmitted after each capture from the A/D converter 4 to the digital image processor 5. In this first preferred embodiment, the motion processor 6 includes a pixel combiner 9, an object motion detector 10, an image combiner 11, and an image portion replacer 15. In the image combiner 9, each pixel in $i_1(x,y)$ is assigned to a pixel sub-array. A pixel sub-array is defined as an array of pixels that are all of the same type and are located close together. The pixel sub-array that is shown in Bayer array of FIG. 3 where this array is one row high and two columns wide and is composed of red pixels 12, and 13. Although the present invention describes a pixel combiner 9 that uses pixel sub-arrays that are one row high and two columns wide and contains two pixels of the same type, those skilled in the art will recognize that the present invention can be applied using pixel sub-arrays of other dimensions or that contain a different amount of pixels, or that contain pixels of different types with equal effect. Each pixel in the image belongs to only one pixel sub-array, so the image represented in FIG. 3 has six red sub-arrays, six blue sub-arrays and twelve green sub-arrays. In the pixel combiner 9, once all the pixels in the image $i_1(x,y)$ have been assigned to a sub-array, all the pixels in each sub-array are summed together and the pixels in each sub-array are replaced by the resulting sum value of each sub-array. So, for example, the values of pixels 12 and 13 in FIG. 3 would each be replaced by the sum of the values of pixels 12 and 13. Since the values of all the pixels in a sub-array are replaced by the same single sum value, the image that results after processing all the sub-arrays of image $i_1(x,y)$ as described above is a low-resolution image that has the same number and type of pixels as $i_1(x,y)$. Therefore, the output of the pixel combiner 9 is a third digital image $c(x,y)$ which is a low resolution sparsely sampled digital image. Since the values of all the pixels in a sub-array are replaced by the same single sum value, the third digital image $c(x,y)$ has a higher signal (i.e. it is brighter) and relatively less noise than the first digital image $i_1(x,y)$. Because of the pixel-combining step, the third digital image $c(x,y)$ has increased brightness at the expense of reduced resolution.

As contemplated in the invention, the number of pixels q that are combined in the sub array would be similar to the n number of images in the captured sequence. In this preferred embodiment example there are two pixels in each sub-array (q=2) because there are two images (n=2) in the captured sequence: a first digital image $i_1(x,y)$ and a second digital image $i_2(x,y)$. This ensures that the third digital image $c(x,y)$ has the same brightness as the sum of the images in the captured sequence as produced in the fourth digital image $m(x,y)$. Alternatively, one can combine more or less pixels within a sub-array than there are images in the captured sequence if the pixel values in the third digital image $c(x,y)$ are multiplied by a constant k, where k is equal to the number of images in the captured sequence divided by the number of pixels in a sub-array k=n/q. Those skilled in the art will recognize that if k is more than one, then the third digital image $c(x,y)$ will be noisier and have more resolution than if k is less than one. It is therefore advantageous to use a k that is equal to or less than one.

Those skilled in the art will recognize further ways to combine pixel values to form the third digital image $c(x,y)$, some of the further ways can also be used to combine pixel values from the n images to form the fourth digital image $m(x,y)$. The charge from same colored pixels can be combined or binned on the image sensor as is well known in the image sensor art. Combining or binning charge on the image sensor from two pixels doubles the signal level, while the noise associated with sampling and reading out the combined signal remains the same, thereby increasing the signal to noise ratio by a factor of two, representing a corresponding two times increase in the photosensitivity of the combined pixels. In another approach, the voltages corresponding to the measured amounts of charge in same colored pixels can be averaged by first charging capacitors to the voltages produced by the pixels and then connecting the capacitors together to average the voltages, with the capacitors being of equal sizes to perform a simple average or of differing sizes to perform a weighted average. In yet another approach, the pixel values can be converted to digital numbers and the digital numbers can then be combined. Alternatively, the digital representations of the light levels at same colored pixels can be summed or averaged. In this case, the resulting signal increases by a factor of two, but the corresponding noise levels from reading the two pixels combine in quadrature, thereby increasing the noise by the square root of two; the resulting signal to noise ratio of the combined pixels therefore increases by the square root of two over the uncombined signals. A similar analysis applies to voltage or digital averaging. Those skilled in the art will also recognize that other forms of spatial filters can be used other than summing to increase the brightness of the third digital image $c(x,y)$ wherein the weighting factors between pixels are nonuniform.

Both the first digital image $i_1(x,y)$ and the second digital image $i_2(x,y)$ are transmitted to the object motion detector 10 to produce a motion map, $p(x,y)$. The object motion detector 10 identifies static and moving regions between the first digital image $i_1(x,y)$ and the second digital image $i_2(x,y)$ and stores the identifying information in the motion map $p(x,y)$. Those skilled in the art will recognize that the motion detector can be implemented in many ways within the spirit of the invention. The implementation in this preferred embodiment uses pixel-block difference thresholds. The first digital image $i_1(x,y)$ and the second digital image $i_2(x,y)$ are partitioned into blocks of pixels, similarly but not necessarily the same as the sub-array partitioning that is used within the pixel combiner 9 and described above. The size of sub-arrays will usually be smaller than the size of blocks so as to not give up too much resolution in the final image and, conversely, the size of blocks will be greater than the size of sub-arrays to make the motion detection more robust. The blocks of pixels in this preferred embodiment are 32 rows high and 32 rows wide and each block contains pixels of the same type, but those skilled in the art will recognize that other pixel blocks sizes, shapes, and compositions are also possible. The pixel values in each block of the first digital image $i_1(x,y)$ are averaged and the average is subtracted from the average of the corresponding block in the second digital image $i_2(x,y)$. If the absolute value of a block difference is greater than some pre-determined threshold T, then it is determined that there is object motion in that block between the first digital image $i_1(x,y)$ and the second digital image $i_2(x,y)$. The threshold T can be chosen separately for each block in the first digital image $i_1(x,y)$, and in this preferred embodiment T depends on the expected magnitude of the image noise given the average value of a block in the first digital image $i_1(x,y)$. As mentioned above, if a block difference is greater than T then it is determined that there is object motion in that block between the first digital image $i_1(x,y)$ and the second digital image $i_2(x,y)$. In that case, the motion map $p(x,y)$ is given a value of one for all pixel locations within that block. If no motion is found for a block then the motion map $p(x,y)$ is given a value of zero for all pixel locations within that block. Therefore, in this preferred embodiment $p(x,y)$ is a binary motion map. Those skilled in the art will recognize that the motion map $p(x,y)$ can take on other functional forms such as, for example, a fuzzy logic map or a probabilistic determination map.

A fourth digital image $m(x,y)$ is formed within the image combiner 11 by summing the pixel values of the first digital image $i_1(x,y)$ and the second digital image $i_2(x,y)$ to produce a brighter image which contains object motion blur.

The motion map $p(x,y)$ is transmitted to the image portion replacer 15 along with the third digital image $c(x,y)$ and the fourth digital image $m(x,y)$. The image portion replacer 15 applies a combining function, using the motion map $p(x,y)$, along with the fourth digital image $m(x,y)$ and the third digital image $c(x,y)$ to produce a fifth digital image $d(x,y)$ with reduced object motion blur. The combining function is such that the value of a pixel in $d(x, y)$ is equal to the value of the corresponding pixel in the fourth digital image $m(x,y)$ if no motion ($p(x,y)=0$) is indicated in the corresponding location of the motion map $p(x,y)$.

Moreover, the combining function is such that the value of a pixel in the fifth digital image $d(x,y)$ is equal to the value of a pixel in the third digital image $c(x,y)$ if motion is indicated ($p(x,y)=1$) in the corresponding location of the motion map $p(x,y)$. In this preferred embodiment of the invention, where the captured sequence contains two images and the motion map is binary, the resulting image $d(x,y)$ is calculated as follows:

$$d(x,y)=p(x,y)c(x,y)+[1-p(x,y)][m(x,y)]. \quad (1)$$

The fifth digital image $d(x,y)$ is an image with reduced object motion blur because the modified exposure time t' that is used to capture the n images in the image sequence is less than the exposure time $t_e$. The image $d(x,y)$ has increased brightness because the effective exposure time for the fourth digital image is nt' and the effective exposure time for the third digital image $c(x,y)$ is qt', both of which are greater than t' and in a preferred embodiment, both are equal to $t_e$. The image $d(x,y)$ has the same amount of noise throughout its locations if the number of pixels in the sub-arrays used in the pixel combiner 9 is the same as the number of images in the capture sequence n. In that case, the amount of noise in image $d(x,y)$ is similar to the amount of noise in an image captured using an exposure time of $t_e$.

The fifth digital image $d(x,y)$ is transmitted to the CFA interpolator 7 as shown in FIG. 1 to produce a sixth digital image $r(x,y)$ which has a full description of the color for each pixel location of the sensed photographic image.

Figure 4:
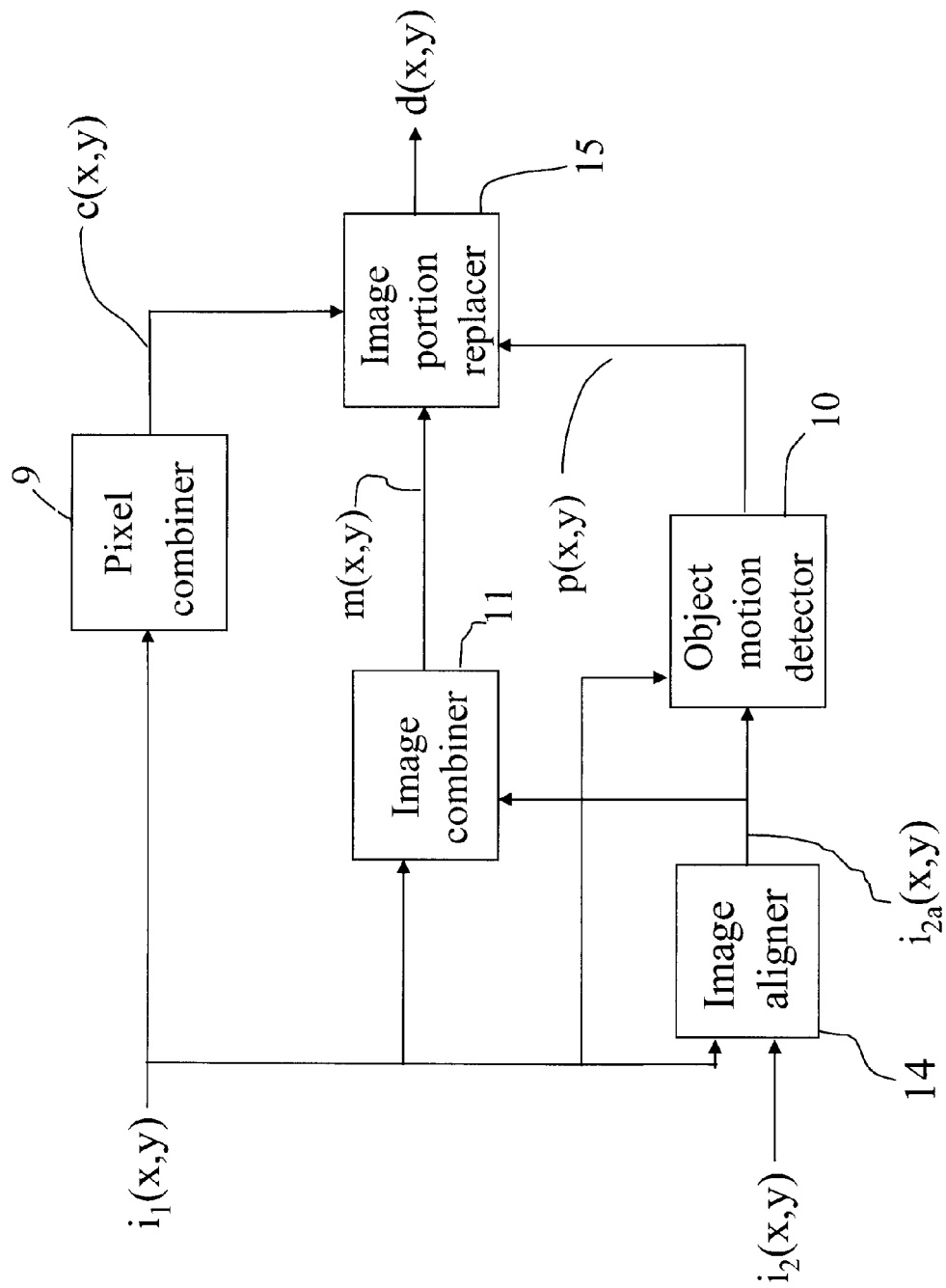
FIG. 4 is a flow diagram which illustrates the present invention when both the objects in the scene and the image capture device are in motion.

In another embodiment of the invention shown in FIG. 4 the image capture device moves between the n captures in the sequence causing image capture device induced blur. In this case the n images captured in the sequence must be aligned with each other to compensate for the image capture device motion between the n captures in the sequence. FIG. 4 shows the added step of an image aligner 14 to align the images to one another.

The process of image alignment in the image aligner 14 is accomplished by comparing pixel values between the images $i_1(x,y)$ and $i_2(x,y)$ to identify the pixel shift $s(x,y)$ between reference image $i_1(x,y)$ and the other n−1 images, $i_2(x,y)$ to $i_n(x,y)$ to produce the best correlation. The pixel values of the images $i_2(x,y)$ to $i_n(x,y)$ are then shifted in location within the image by $s(x,y)$ to produce aligned images $i_{2a}(x,y)$ to $i_{na}(x,y)$ which are compensated for the image capture device motion. The aligned images are then processed by the image combiner 11 and the object motion detector 10 as shown in FIG. 4. The example in FIG. 4 shows the case where n=2 but those skilled in the art will recognize that the process of image alignment as described could be applied to any number of images n captured in a sequence so long as there are common areas with the reference image $i_1(x,y)$. Those skilled in the art will also recognize that in a preferred embodiment, the comparing of pixel values between the n images would be done on compressed versions of the n images to determines (x,y), with a reduced amount of data so that image processing speed can be increased. Those skilled in the art will also recognize that the embodiment shown in FIG. 4 compensates for motion of the image capture device thereby providing a stabilizing influence during image capture without the need for a gyroscopic device to sense motion of the image capture device or a special lens with a laterally moveable lens element to compensate for motion of the image capture device. Although, it will be recognized that using a gyroscopic device to measure motion of the image capture device and at least partially aligning the n images based on the measured motion of the image capture device falls within the scope of the present invention.

In the case of a video capture, the group of n images are continuously changed so the n images are shifted within a selected number of images to insure that there are common areas for comparison between the images being aligned. A method for image alignment of a video capture based on a compressed image is described in U.S. patent application Ser. No. 11/130,690 by Deever et al and is incorporated herein by reference. The invention adds the steps of creating a lower resolution image with increased brightness c(x,y) portions of which are used to replace portions of the aligned and combined image m(x,y) as defined by the motion map p(x,y), to produce images d(x,y) continuously with reduced object motion blur and reduced image capture motion induced blur. The alignment method described by Deever is based on a correlation of pixel values in compressed versions of the n images to define the pixel shifts needed to align the n images prior to combining to form the m(x,y) images, the use of a gyroscopic device to measure the motion of the image capture device and at least partially define the pixel shifts needed to align the n images during video capture is within the scope of the invention.

Although the present invention is described for the case of a capture sequence with two images, it can be used to produce reduced object motion blur images in a continuous fashion using sequential images as in the case of video image capture.

The invention has been described in detail with particular reference to certain preferred embodiments thereof, but it will be understood that variations and modifications are effected within the spirit and scope of the invention.

PARTS LIST

1 Lens
2 Optical lowpass filter
3 Electronic image sensor
4 A/D converter
5 Digital image processor
6 Motion processor
7 CFA interpolator
9 Pixel combiner
10 Object motion detector
11 Image combiner
12 A red pixel belonging to the first red sub-array
13 A red pixel belonging to the first red sub-array
14 Image aligner
15 Image portion replacer

The invention claimed is:

1. A method of producing a digital image with reduced object motion blur, comprising:
   a. capturing at least a first and second digital image of a scene using an exposure time that reduces image blur;
   b. combining pixels of the first digital image to produce a third digital image which is brighter than the first and second digital images and has a lower resolution than either the first or second digital images;
   c. identifying static and moving regions between the first and second digital images;
   d. operating on the first and second digital images to produce a fourth digital image which is brighter than the first and second digital images and has object motion blur; and
   e. replacing the moving regions in the fourth digital image with corresponding regions from the third digital image to thereby provide a fifth digital image with reduced object motion blur and increased brightness.

2. The method of claim 1 wherein the first digital image is captured by an electronic image sensor and the second digital image is provided from a second capture of the scene with combined pixels.

3. The method of claim 2 wherein pixels are combined by binning the charge from the pixels, by averaging the voltages produced by the pixels, or by first converting the pixel values to digital numbers and then combining the digital numbers, or combinations thereof.

4. The method of claim 3 wherein the voltages are averaged by first charging capacitors to the voltages produced by the pixels and then connecting the capacitors together to average the voltages, with the capacitors being of equal sizes to perform a simple average or of differing sizes to perform a weighted average.

5. The method of claim 1 wherein the third digital image is formed by applying a spatial filter to the pixel values of the first digital image to increase the brightness of the third digital image.

6. The method of claim 1 wherein the first and second digital images are summed but are aligned prior to being summed to form the fourth digital image.

7. The method of claim 6 wherein the alignment of the first and second digital images includes comparing pixel values between the first and second digital images and the pixel values are shifted.

8. The method of claim 5 wherein a gyroscopic device is used to measure the motion of the image capture device and the first and second digital images are at least partially aligned based on the measured motion of the image capture device.

* * * * *